United States Patent
Nomaru

(10) Patent No.: US 9,289,857 B2
(45) Date of Patent: Mar. 22, 2016

(54) LASER PROCESSING APPARATUS

(71) Applicant: Disco Corporation, Tokyo (JP)

(72) Inventor: Keiji Nomaru, Tokyo (JP)

(73) Assignee: Disco Corporation, Tokyo (JP)

( * ) Notice: Subject to any disclaimer, the term of this patent is extended or adjusted under 35 U.S.C. 154(b) by 434 days.

(21) Appl. No.: 13/954,302

(22) Filed: Jul. 30, 2013

(65) Prior Publication Data

US 2014/0034624 A1  Feb. 6, 2014

(30) Foreign Application Priority Data

Jul. 31, 2012  (JP) ................................. 2012-169737

(51) Int. Cl.
| | |
|---|---|
| *B23K 26/364* | (2014.01) |
| *G02B 6/32* | (2006.01) |
| *B23K 26/36* | (2014.01) |
| *B23K 26/06* | (2014.01) |
| *B23K 26/08* | (2014.01) |
| *B23K 26/40* | (2014.01) |

(52) U.S. Cl.
CPC ........... *B23K 26/367* (2013.01); *B23K 26/0648* (2013.01); *B23K 26/0853* (2013.01); *B23K 26/0869* (2013.01); *B23K 26/364* (2015.10); *B23K 26/40* (2013.01); *B23K 2203/50* (2015.10); *G02B 6/32* (2013.01)

(58) Field of Classification Search
CPC ................................ B23K 26/364; G02B 6/32
USPC ................. 219/121.68, 121.73, 121.75; 385/33–35, 39, 52, 79; 372/6
See application file for complete search history.

(56) References Cited

U.S. PATENT DOCUMENTS

| | | | | |
|---|---|---|---|---|
| 6,360,039 | B1 * | 3/2002 | Bernard | G02B 6/24 156/272.8 |
| 6,888,853 | B1 * | 5/2005 | Jurgensen | B23K 26/0604 101/150 |
| 7,346,237 | B2 * | 3/2008 | Matsumura | G02B 6/32 385/34 |
| 7,724,424 | B2 * | 5/2010 | Tamaoki | H01S 3/06716 359/341.3 |

FOREIGN PATENT DOCUMENTS

JP    2007-207856    8/2007

\* cited by examiner

*Primary Examiner* — Samuel M Heinrich
(74) *Attorney, Agent, or Firm* — Greer Burns & Crain, Ltd.

(57) ABSTRACT

A laser processing apparatus has an optical transmitting unit for guiding a laser beam to a focusing unit. The optical transmitting unit includes a focusing lens for focusing the laser beam, an optical fiber unit for inputting the focused laser beam and guiding it to the focusing unit. The optical fiber unit includes an LMA fiber for inputting the focused laser beam. The LMA fiber has a large-diameter core covered with a cladding, a transmitting fiber provided by an SM fiber or a PM fiber. The transmitting fiber has a small-diameter core covered with a cladding, the small-diameter core having a diameter corresponding to the wavelength of the laser beam oscillated by the laser oscillator. A connector connects the LMA fiber and the transmitting fiber so that these fibers are axially aligned with each other.

3 Claims, 3 Drawing Sheets

LASER PROCESSING APPARATUS

BACKGROUND OF THE INVENTION

1. Field of the Invention

The present invention relates to a laser processing apparatus for performing laser processing to a workpiece by applying a pulsed laser beam thereto.

2. Description of the Related Art

In a semiconductor device fabrication process, a plurality of crossing division lines called streets are formed on the front side of a substantially disk-shaped semiconductor wafer to thereby partition a plurality of regions where a plurality of devices such as ICs and LSIs are respectively formed. The semiconductor wafer is cut along the streets to thereby divide the regions where the devices are formed from each other, thus obtaining a plurality of individual semiconductor chips. Further, an optical device wafer is provided by forming a plurality of optical devices including photodetectors such as photodiodes and light emitting devices such as laser diodes on the front side of a sapphire substrate. The optical device wafer is also cut along the streets to obtain the individual optical devices divided from each other, such as photodiodes and laser diodes, which are widely used in electric equipment.

As a method of dividing a wafer such as a semiconductor wafer and an optical device wafer along the streets, there has been proposed a method including the steps of applying a laser beam to the wafer along the streets to thereby form laser processed grooves on the wafer or modified layers inside the wafer and next breaking the wafer along the laser processed grooves or the modified layers. Such laser processing is performed by using a laser processing apparatus including a chuck table for holding a workpiece and laser beam applying means for applying a laser beam to the workpiece held on the chuck table. The laser beam applying means is composed of a laser oscillator for oscillating a laser beam, focusing means for focusing the laser beam oscillated by the laser oscillator onto the workpiece held on the chuck table, and optical transmitting means for guiding the laser beam oscillated by the laser oscillator to the focusing means.

In general, the optical transmitting means for guiding the laser beam oscillated by the laser oscillator to the focusing means is provided by an optical system composed of a lens and a mirror. However, there is a problem such that the optical system composed of the lens and the mirror mentioned above has a low degree of design flexibility depending on its location. To solve such a problem, optical transmitting means using an optical fiber has been proposed (see Japanese Patent Laid-open No. 2007-207856, for example).

SUMMARY OF THE INVENTION

The optical fiber used as the optical transmitting means for guiding the laser beam to the focusing means mentioned above has a very thin core having a diameter about several times the wavelength of the laser beam to be transmitted. Accordingly, it is difficult to set the focal point of the laser beam oscillated by the laser oscillator on the end surface of the core of the optical fiber. Furthermore, it is also difficult to maintain the condition that the focal point of the laser beam is set on the end surface of the core of the optical fiber. For example, in the case of transmitting a laser beam having a wavelength of 1 μm, an optical fiber with a core having a diameter of about 6 μm is used. In this case, it is difficult to set the focal point of the laser beam on the end surface of the core having a diameter of about 6 μm. Furthermore, there is a problem such that the focal point of the laser beam may deviate from the end surface of the core of the optical fiber due to thermal expansion or strain after it is set on the end surface of the core of the optical fiber.

It is therefore an object of the present invention to provide a laser processing apparatus having optical fiber means which can reliably set the focal point of the laser beam oscillated by the laser oscillator on the input surface (end surface) of the core of the optical fiber and can also maintain the condition that the focal point of the laser beam is set on the input surface of the core of the optical fiber.

In accordance with an aspect of the present invention, there is provided a laser processing apparatus including a chuck table for holding a workpiece; and laser beam applying means for applying a laser beam to the workpiece held on the chuck table, the laser beam applying means including a laser oscillator for oscillating the laser beam, focusing means for focusing the laser beam oscillated by the laser oscillator and applying the laser beam focused to the workpiece held on the chuck table, and optical transmitting means for guiding the laser beam oscillated by the laser oscillator to the focusing means; the optical transmitting means including a focusing lens for focusing the laser beam oscillated by the laser oscillator and optical fiber means for inputting the laser beam focused by the focusing lens and guiding the laser beam to the focusing means; the optical fiber means including an LMA (Large Mode Area) fiber for inputting the laser beam oscillated by the laser oscillator and focused by the focusing lens, the LMA fiber having a large-diameter core covered with a cladding, a transmitting fiber provided by an SM (Single Mode) fiber or a PM (Polarization Maintaining) fiber, the transmitting fiber having a small-diameter core covered with a cladding, the small-diameter core having a diameter corresponding to the wavelength of the laser beam oscillated by the laser oscillator, and connecting means for connecting the LMA fiber and the transmitting fiber so that the LMA fiber and the transmitting fiber are axially aligned with each other.

Preferably, the connecting means includes a connecting member for connecting an end portion of the LMA fiber and an end portion of the transmitting fiber with a given space defined therebetween and a focusing lens provided in the connecting member.

As a modification, the connecting means includes a connecting member for connecting an end portion of the LMA fiber and an end portion of the transmitting fiber with a given space defined therebetween and a GRIN (Gradient Index) lens provided in the connecting member.

According to the present invention, the optical transmitting means includes the focusing lens for focusing the laser beam oscillated by the laser oscillator and the optical fiber means for inputting the laser beam focused by the focusing lens and guiding it to the focusing means. The optical fiber means includes the LMA fiber for inputting the laser beam oscillated by the laser oscillator and focused by the focusing lens, the LMA fiber having a large-diameter core covered with a cladding, the transmitting fiber provided by an SM fiber or a PM fiber, the transmitting fiber having a small-diameter core covered with a cladding, the small-diameter core having a diameter corresponding to the wavelength of the laser beam oscillated by the laser oscillator, and the connecting means for connecting the LMA fiber and the transmitting fiber so that these fibers are axially aligned with each other. Accordingly, the focusing lens for focusing the laser beam oscillated by the laser oscillator is located so that the focal point of the laser beam focused by the focusing lens is set on the input surface of the core of the LMA fiber, wherein the diameter of this core is set to a relatively large value. Accordingly, the focal point of the laser beam can be easily set on the input surface of the core of the LMA fiber. Furthermore, it is possible to solve the problem that the focal point of the laser beam set on the input surface of the core of the LMA fiber may deviate from the input surface due to thermal expansion or strain.

Further, the LMA fiber and the transmitting fiber constituting the optical fiber means are connected by the connecting means so that these fibers are axially aligned with each other. Accordingly, the laser beam output from the output surface of the core of the LMA fiber can be reliably input to the input surface of the core of the transmitting fiber, wherein the diameter of this core is set to a relatively small value.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
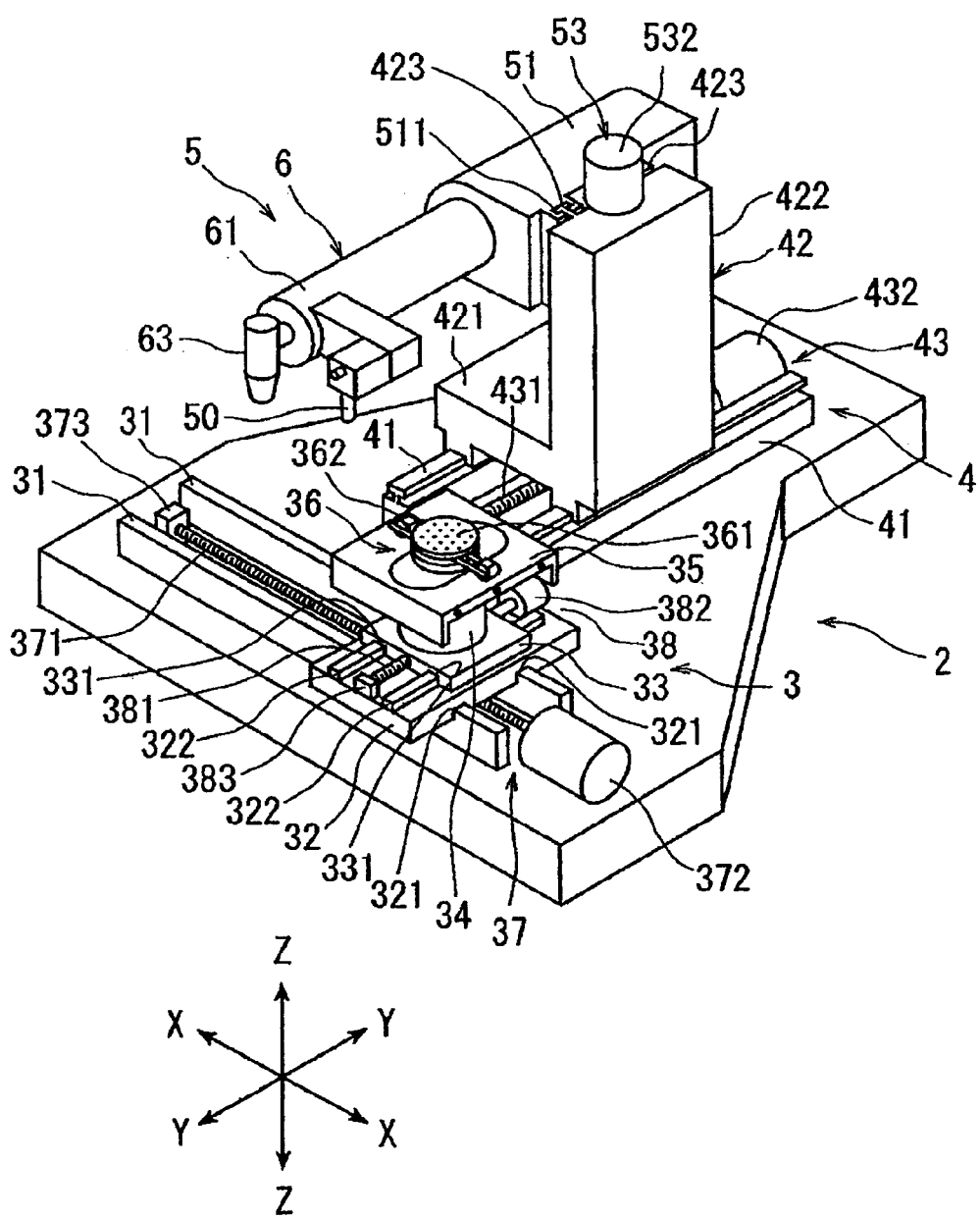
FIG. 1 is a perspective view of a laser processing apparatus according to a preferred embodiment of the present invention.

A preferred embodiment of the laser processing apparatus according to the present invention will now be described in detail with reference to the attached drawings. FIG. 1 is a perspective view of a laser processing apparatus according to a preferred embodiment of the present invention. The laser processing apparatus shown in FIG. 1 includes a stationary base 2, a chuck table mechanism 3 for holding a workpiece, the chuck table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z perpendicular to a holding surface of a chuck table to be hereinafter described.

The chuck table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in the Y direction, a cover table 35 supported by a cylindrical member 34 standing on the second slide block 33, and a chuck table 36 as workpiece holding means. The chuck table 36 has a vacuum chuck 361 formed of a porous material. A workpiece such as a disk-shaped semiconductor wafer is adapted to be held under suction on the vacuum chuck 361 as a workpiece holding surface by operating suction means (not shown). The chuck table 36 is rotatable by a pulse motor (not shown) provided in the cylindrical member 34. Further, the chuck table 36 is provided with clamps 362 for fixing an annular frame (not shown).

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The chuck table mechanism 3 further includes feeding means 37 provided by a ball screw mechanism for moving the first slide block 32 in the X direction along the guide rails 31. The feeding means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 further includes first indexing means 38 provided by a ball screw mechanism for moving the second slide block 33 in the Y direction along the guide rails 322. The first indexing means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser beam applying unit supporting mechanism 4 includes a pair of guide rails 41 provided on the stationary base 2 so as to extend parallel to each other in the Y direction and a movable support base 42 provided on the guide rails 41 so as to be movable in the Y direction. The movable support base 42 is composed of a horizontal portion 421 slidably supported to the guide rails 41 and a vertical portion 422 extending vertically upward from the upper surface of the horizontal portion 421. Further, a pair of guide rails 423 are provided on one side surface of the vertical portion 422 so as to extend parallel to each other in the Z direction. The laser beam applying unit supporting mechanism 4 further includes second indexing means 43 provided by a ball screw mechanism for moving the movable support base 42 in the Y direction along the guide rails 41. The second indexing means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 at a central portion thereof. Accordingly, the movable support base 42 is moved in the Y direction along the guide rails 41 by operating the pulse motor 432 to normally or reversely rotate the externally threaded rod 431.

The laser beam applying unit 5 includes a unit holder 51 and pulsed laser beam applying means 6 mounted to the unit holder 51. The unit holder 51 is formed with a pair of guided grooves 511 for slidably engaging the pair of guide rails 423 provided on the vertical portion 422 of the movable support base 42. Accordingly, the unit holder 51 is supported to the movable support base 42 so as to be movable in the Z direction by the slidable engagement of the guided grooves 511 with the guide rails 423.

The laser beam applying unit 5 further includes focal position adjusting means 53 for moving the unit holder 51 along the guide rails 423 in the Z direction perpendicular to the workpiece holding surface of the chuck table 36. Like the feeding means 37, the first indexing means 38, and the second indexing means 43, the focal position adjusting means 53 is provided by a ball screw mechanism. That is, the focal position adjusting means 53 includes an externally threaded rod (not shown) extending parallel to the guide rails 423 so as to be interposed therebetween and a pulse motor 532 as a drive source for rotationally driving this externally threaded rod. Accordingly, the unit holder 51 and the pulsed laser beam applying means 6 are moved in the Z direction along the guide rails 423 by operating the pulse motor 532 to normally or reversely rotate this externally threaded rod. In this preferred embodiment, when the pulse motor 532 is normally operated, the pulsed laser beam applying means 6 is moved upward, whereas when the pulse motor 532 is reversely operated, the pulsed laser beam applying means 6 is moved downward.

The pulsed laser beam applying means 6 includes a cylindrical casing 61 fixed to the unit holder 51 so as to extend in a substantially horizontal direction. Imaging means 50 for detecting a subject area to be laser-processed by the pulsed laser beam applying means 6 is provided at the front end portion of the cylindrical casing 61. The imaging means 50 includes an imaging device (infrared CCD), and an image signal obtained by the imaging means 50 is transmitted to control means (not shown).

Figure 2:
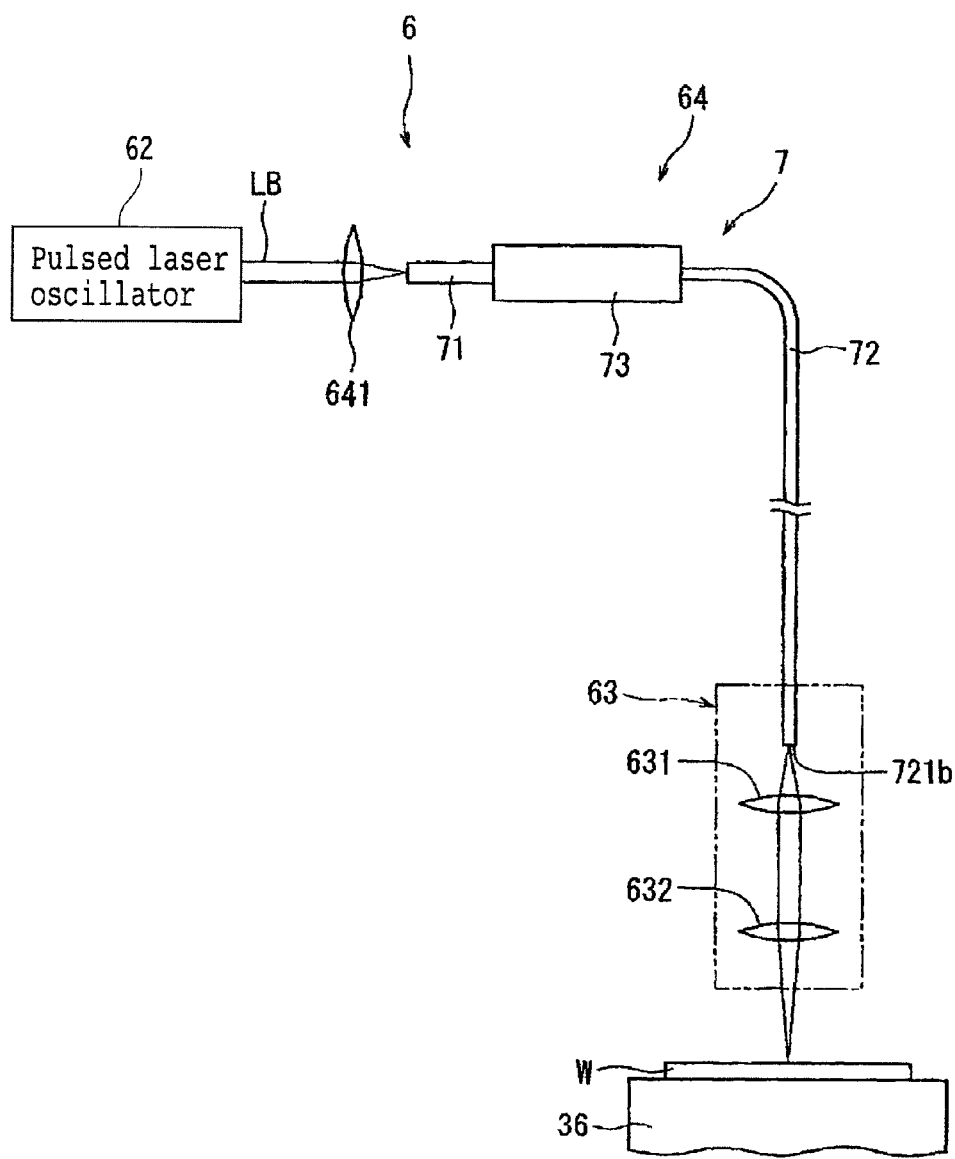
FIG. 2 is a block diagram showing the configuration of pulsed laser beam applying means included in the laser processing apparatus shown in FIG. 1.

As shown in FIG. 2, the pulsed laser beam applying means 6 includes a pulsed laser beam oscillator 62 provided in the casing 61 for oscillating a pulsed laser beam LB, focusing means 63 provided at the front end of the casing 61 for focusing the pulsed laser beam LB oscillated by the pulsed laser beam oscillator 62 and applying this pulsed laser beam LB focused to a workpiece W held on the chuck table 36, and optical transmitting means 64 for transmitting the pulsed laser beam LB oscillated by the pulsed laser beam oscillator 62 to the focusing means 63. The optical transmitting means 64 is composed of a focusing lens 641 for focusing the pulsed laser beam LB oscillated by the pulsed laser beam oscillator 62 and optical fiber means 7 for inputting the pulsed laser beam LB focused by the focusing lens 641 and guiding this pulsed laser beam LB to the focusing means 63.

The pulsed laser beam oscillator 62 is provided by a YAG laser oscillator or a YVO4 laser oscillator. The pulsed laser beam LB to be oscillated by the pulsed laser beam oscillator 62 is set as follows:
Wavelength: 1064 nm
Repetition frequency: 100 kHz
Average power: 0.2 W The focusing means 63 is composed of a collimating lens 631 for collimating the pulsed laser beam LB output from the optical fiber means (optical fiber unit) 7 constituting the optical transmitting means 64 and an objective focusing lens 632 for focusing the pulsed laser beam LB collimated by the collimating lens 631 and applying this pulsed laser beam LB focused to the workpiece W held on the chuck table 36.

The focusing lens 641 constituting the optical transmitting means 64 is located so that the focal point of the pulsed laser beam LB oscillated by the pulsed laser beam oscillator 62 and then focused by the focusing lens 641 is set on one end surface (input surface) of the core of an LMA fiber (to be hereinafter described) constituting the optical fiber means 7.

The configuration of the optical fiber means 7 will now be described. As shown in FIG. 2, the optical fiber means 7 includes an LMA (Large Mode Area) fiber 71 for inputting the pulsed laser beam LB focused by the focusing lens 641, the LMA fiber 71 having a large-diameter core covered with a cladding, a transmitting fiber 72 provided by an SM (Single Mode) fiber or a PM (Polarization Maintaining) fiber, the transmitting fiber 72 having a small-diameter core covered with a cladding, the small-diameter core having a diameter corresponding to the wavelength of the pulsed laser beam LB oscillated by the pulsed laser beam oscillator 62, and connecting means 73 for connecting the LMA fiber 71 and the transmitting fiber 72 so that these fibers 71 and 72 are axially aligned with each other.

Figure 3:
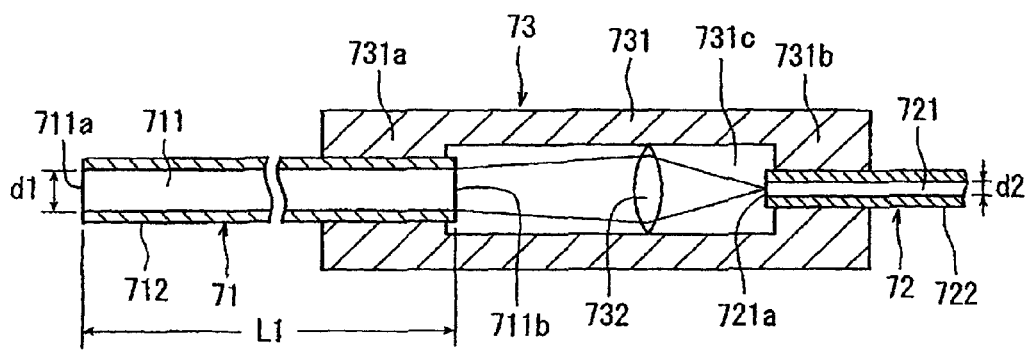
FIG. 3 is a sectional view showing an essential part of optical fiber means constituting the pulsed laser beam applying means shown in FIG. 2.

The configuration of the LMA fiber 71, the transmitting fiber 72, and the connecting means 73 will now be described with reference to FIG. 3. The LMA fiber 71 is composed of a core 711 and a cladding 712 covering the core 711. The core 711 of the LMA fiber 71 has a diameter (d1) set to 35 µm and a length (L1) set to 10 to 20 cm. The core 711 of the LMA fiber 71 has an input surface 711a (light entrance surface) opposed to the focusing lens 641 and an output surface 711b (light emergence surface) exposed to an inside space in the connecting means 73.

The transmitting fiber 72 provided by an SM fiber or a PM fiber is composed of a core 721 and a cladding 722 covering the core 721 like the LMA fiber 71. The core 721 of the transmitting fiber 72 has a diameter (d2) set to 6 µm and a length set to 2 to 3 m. The core 721 of the transmitting fiber 72 has an input surface 721a (light entrance surface) exposed to the inside space in the connecting means 73 and opposed to the output surface 711b of the core 711 of the LMA fiber 71. Further, as shown in FIG. 2, the core 721 of the transmitting fiber 72 has an output surface 721b (light emergence surface) opposed to the collimating lens 631 of the focusing means 63.

Referring again to FIG. 3, the connecting means 73 is composed of a cylindrical connecting member 731 formed of a suitable synthetic resin and a focusing lens 732 provided in the connecting member 731. The connecting member 731 is composed of a first support portion 731a for fixing an end portion of the LMA fiber 71 near the output surface 711b thereof, a second support portion 731b for fixing an end portion of the transmitting fiber 72 near the input surface 721a thereof, and a lens accommodating portion 731c defined between the first support portion 731a and the second support portion 731b for accommodating the focusing lens 732. The focusing lens 732 functions to focus the pulsed laser beam LB output from the output surface 711b of the core 711 of the LMA fiber 71. The focusing lens 732 is located so that the focal point of the pulsed laser beam LB focused by the focusing lens 732 is set on the input surface 721a of the core 721 of the transmitting fiber 72.

Figure 4:
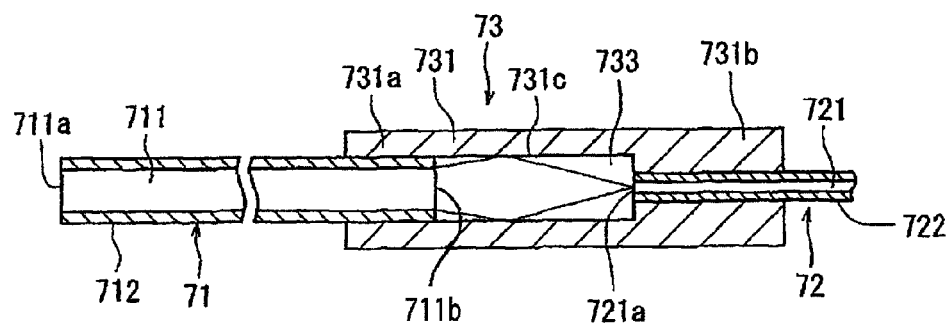
FIG. 4 is a sectional view similar to FIG. 3, showing a modification of the optical fiber means.

A modification of the connecting means 73 will now be described with reference to FIG. 4. The connecting means 73 shown in FIG. 4 is different from the connecting means 73 shown in FIG. 3 in only the lens provided in the lens accommodating portion 731c of the connecting member 73, and the other configuration is substantially the same as that shown in FIG. 3. Accordingly, the same parts are denoted by the same reference symbols and the description thereof will be omitted in this modification. More specifically, the connecting means 73 shown in FIG. 4 includes a GRIN (Gradient Index) lens 733 provided in the lens accommodating portion 731c of the connecting member 731. The GRIN lens 733 functions to focus the pulsed laser beam LB output from the output surface 711b of the core 711 of the LMA fiber 71. The GRIN lens 733 is located so that the focal point of the pulsed laser beam LB focused by the GRIN lens 733 is set on the input surface 721a of the core 721 of the transmitting fiber 72. While the GRIN lens 733 may be fixed by the connecting member 731, it is preferable to reliably fix the GRIN lens 733 by fusion-splicing one end of the GRIN lens 733 to the output surface 711b of the LMA fiber 71.

The operation of the pulsed laser beam applying means 6 will now be described. The pulsed laser beam LB oscillated by the pulsed laser beam oscillator 62 is focused by the focusing lens 641 to enter the input surface 711a of the core 711 of the LMA fiber 71. The focusing lens 641 for focusing the pulsed laser beam LB oscillated by the pulsed laser beam oscillator 62 is located so that the focal point of the pulsed laser beam LB focused by the focusing lens 641 is set on the input surface 711a of the core 711 of the LMA fiber 71, wherein the diameter (d1) of the core 711 is set to a relatively large value of 35 µm. Accordingly, the focal point of the pulsed laser beam LB can be easily set on the input surface 711a of the core 711. Furthermore, it is possible to solve the problem that the focal point of the pulsed laser beam LB set on the input surface 711a of the core 711 may deviate from the input surface 711a due to thermal expansion or strain.

The pulsed laser beam LB input to the input surface 711a of the core 711 of the LMA fiber 71 is guided by the core 711 of the LMA fiber 71 and then output from the output surface 711b of the core 711 to the lens accommodating portion 731c of the connecting member 731 of the connecting means 73. The pulsed laser beam LB output from the output surface 711b of the core 711 of the LMA fiber 71 is focused by the focusing lens 732 to enter the input surface 721a of the core 721 of the transmitting fiber 72. The LMA fiber 71 and the transmitting fiber 72 are connected by the connecting means 73 so that these fibers 71 and 72 are axially aligned with each other. Furthermore, the focusing lens 732 is positioned so that the focal point of the pulsed laser beam LB focused by the focusing lens 732 is set on the input surface 721a of the core 721 of the transmitting fiber 72. Accordingly, although the diameter (d2) of the core 721 of the transmitting fiber 72 is set to a relatively small value of 6 µm, the focal point of the pulsed laser beam LB output from the output surface 711b of the core 711 of the LMA fiber 71 and then focused by the focusing lens 732 can be reliably set on the input surface 721a of the core 721 of the transmitting fiber 72.

The pulsed laser beam LB input to the input surface 721a of the core 721 of the transmitting fiber 72 is transmitted through the core 721 of the transmitting fiber 72 and then output from the output surface 721b of the core 721 toward the collimating lens 631 of the focusing means 63. The pulsed laser beam LB output from the output surface 721b of the core 721 of the transmitting fiber 72 is collimated by the collimating lens 631 and next focused by the objective focusing lens 632 of the focusing means 63 onto the workpiece W held on the chuck table 36.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
a chuck table for holding a workpiece; and
laser beam applying means for applying a laser beam to said workpiece held on said chuck table, said laser beam applying means including a laser oscillator for oscillating said laser beam, focusing means for focusing said laser beam oscillated by said laser oscillator and applying said laser beam focused to said workpiece held on said chuck table, and optical transmitting means for guiding said laser beam oscillated by said laser oscillator to said focusing means;
said optical transmitting means including a focusing lens for focusing said laser beam oscillated by said laser oscillator and optical fiber means for inputting said laser beam focused by said focusing lens and guiding said laser beam to said focusing means;
said optical fiber means including
a large mode area fiber for inputting said laser beam oscillated by said laser oscillator and focused by said focusing lens, said large mode area fiber having a large-diameter core covered with a cladding,
a transmitting fiber provided by a single mode fiber or a polarization maintaining fiber, said transmitting fiber having a small-diameter core covered with a cladding, said small-diameter core having a diameter corresponding to the wavelength of said laser beam oscillated by said laser oscillator, and
connecting means for connecting said large mode area fiber and said transmitting fiber so that said large mode area fiber and said transmitting fiber are axially aligned with each other.

2. The laser processing apparatus according to claim 1, wherein said connecting means includes a connecting member for connecting an end portion of said large mode area fiber and an end portion of said transmitting fiber with a given space defined therebetween and a focusing lens provided in said connecting member.

3. The laser processing apparatus according to claim 1, wherein said connecting means includes a connecting member for connecting an end portion of said large mode area fiber and an end portion of said transmitting fiber with a given space defined therebetween and a gradient index lens provided in said connecting member.

* * * * *